Jan. 1, 1929. 1,697,616
G. E. SMITH
WOODEN STEERING WHEEL AND METHOD OF MAKING THE SAME
Original Filed Sept. 26, 1922    2 Sheets-Sheet 1

Inventor
Grant E. Smith.
By his Attorneys.
Emery Booth Janney & Varney

Jan. 1, 1929.

G. E. SMITH 1,697,616

WOODEN STEERING WHEEL AND METHOD OF MAKING THE SAME

Original Filed Sept. 26, 1922   2 Sheets-Sheet 2

Inventor
Grant E. Smith.
By his Attorneys.
Emery Booth Janney & Varney

Patented Jan. 1, 1929.

1,697,616

UNITED STATES PATENT OFFICE.

GRANT E. SMITH, OF POUGHKEEPSIE, NEW YORK.

WOODEN STEERING WHEEL AND METHOD OF MAKING THE SAME.

Application filed September 26, 1922, Serial No. 590,605. Renewed June 25, 1926.

The present invention relates to fabricated structures of wood or suitable material and to the manufacture thereof; the principal object being to provide a strong, durable, fabricated structure made almost entirely of wood or the like and to provide an economical and expeditious method of manufacturing the same. Inasmuch as the invention has been developed in connection with the manufacture of steering wheels for automobiles, such an embodiment of the invention has been selected for illustration and description herein.

The manufacture of steering wheels by the methods commonly employed involves usually the use of a metal spider for the reason that the spider made of wood in accordance with the known methods of making similar articles would not have sufficient strength. Furthermore, the manufacture of steering wheels entirely of wood in accordance with known methods would involve considerable expense in the forming of the article and in the finishing of the same to afford the desired surface.

The present invention provides a novel method of manufacture whereby a steering wheel may be made entirely, or substantially entirely, of wood which is so treated during the process of manufacture that the desired strength is obtained without making any part of the wheel of undue size. Furthermore, the method provided can be operated economically and expeditiously and relatively inexpensive raw materials can be used. Wheels made in accordance with the invention will not appreciably warp or shrink and are hard, durable and weather-proof.

The nature and objects of the invention will be better understood from a description of an illustrative embodiment thereof.

In the drawings forming a part hereof:

The steering wheel shown consists of a rim 5 secured to the arms 6, the rim and arms being molded together and both being molded to the form shown from partially pre-formed blank sections.

The preferred method of making the wheel shown involves applying a suitable coating to previously prepared preliminarily shaped wood blanks and molding the blanks to form the finished wheel.

The preliminary treatment of the blank to form the same and to prepare it for the molding operation may vary considerably. As shown the rim blank is formed from straight pieces of wood by steaming and bending, the several pieces being assembled to form a complete rim. The spokes, which in the finished structure constitute a spider, are separate pieces, the outer end of each of which is inserted in a suitable recess in the rim and the inner ends of which are assembled to form a central hub portion for connection to a steering post by any suitable securing means. Preferably and as shown the inner ends of the arms or spokes meet to form a continuous annular hub portion. The arms may merely meet edge to edge to form butt joints or they may be tongued and grooved or otherwise formed to provide a more or less interlocking connection with or without additional members. Any suitable wood such for example as maple, hickory, beech, birch, ash, gum, etc., may be used and the same or different woods may be used for the rim and spoke members. All edges of the blank should be rounded so that no sharp corners are presented to the mold but the shape of the blank may vary considerably from the final shape desired.

Preferably but not necessarily the sections of the blank are kiln dried for several days and then the coating of adhesive is applied in any suitable way. It is desirable that the coating material should be of such character that during the molding operation and without separate treatment it will become cured to form a permanent, hard, wear-resisting surface.

The coating material may be a suitable phenolic condensation product.

Figure 1:
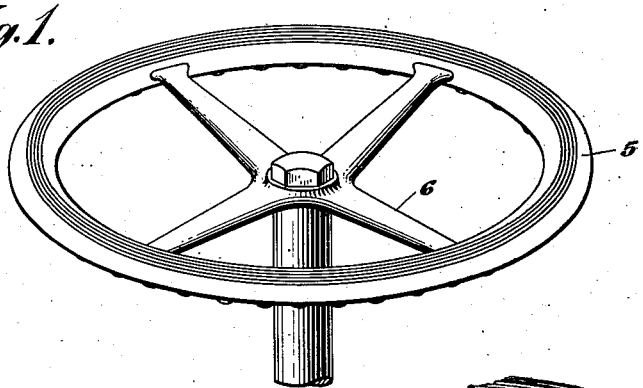
Figure 1 is a perspective view of an automobile steering wheel made in accordance with the invention.
Figure 2:
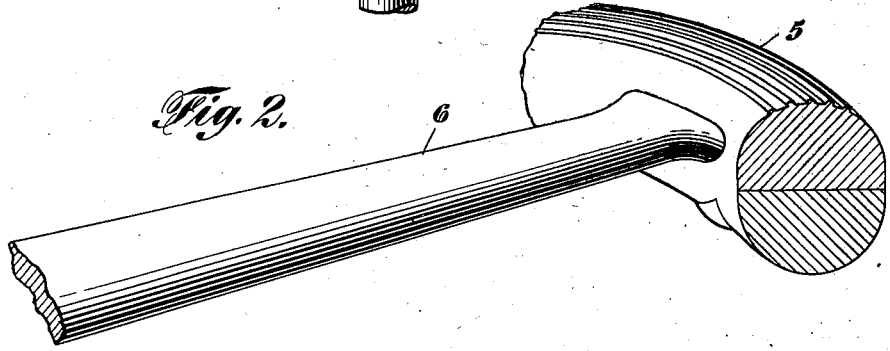
Figure 2 is a perspective view partly in section of a portion of the steering wheel rim and spoke.
Figure 3:
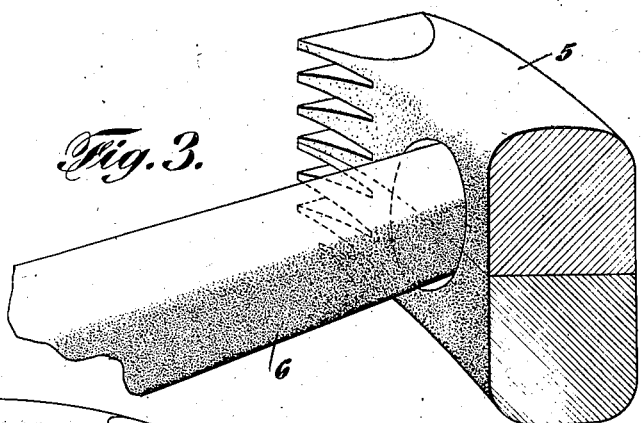
Figure 3 is a perspective view partly in section of a portion of the blank from which the rim and spoke shown in Figure 2 was made showing the shape and relative size of the same before the compressing and molding operation.

I find it convenient to dissolve the phenolic condensation product in a suitable solvent, such as methyl alcohol, making the solution of a consistency similar to that of varnish and to apply the same to the sections by dipping them in the solution and allowing them to dry. If an insufficient amount of the coating is applied to the sections by one dipping operation, they may be re-dipped or a similar material in dry powdered form may be added by dusting on after the first dipping operation and while the solution is still wet or tacky. The coating may be forced into the blank sections under pressure instead of being merely superficially applied by dipping or the like. If desired, the sections may be roughened to facilitate adherence of the coating but ordinarily this is not necessary. Whatever way the coating is applied the coated blank will have a rough appearance as indicated by stippling in Figures 3 and 4.

Figure 4:
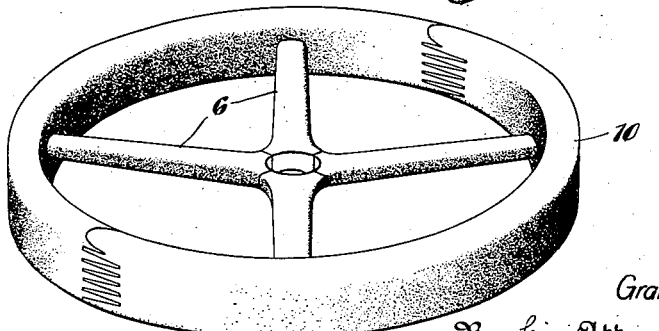
Figure 4 is a perspective view showing a set of blank sections assembled ready to be compressed and molded to form the steering wheel shown in Figure 1.
Figure 5:
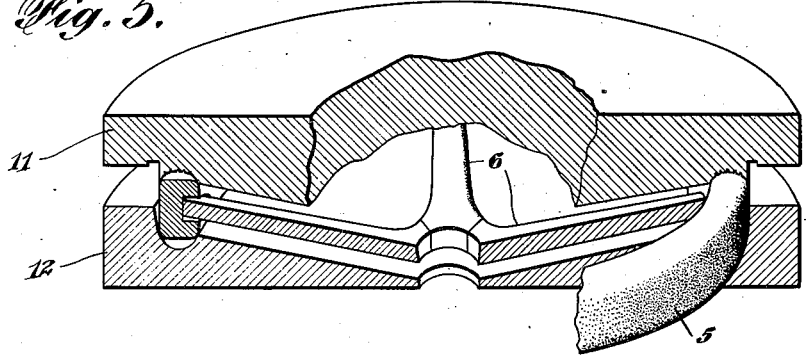
Figure 5 is a perspective view somewhat diagrammatic in character and partly in section illustrating a suitable mold equipment which may be used in carrying out the method of manufacture, showing the assembled parts in the mold and the mold in partially closed position ready for the compressing and molding operation.
Figure 6:
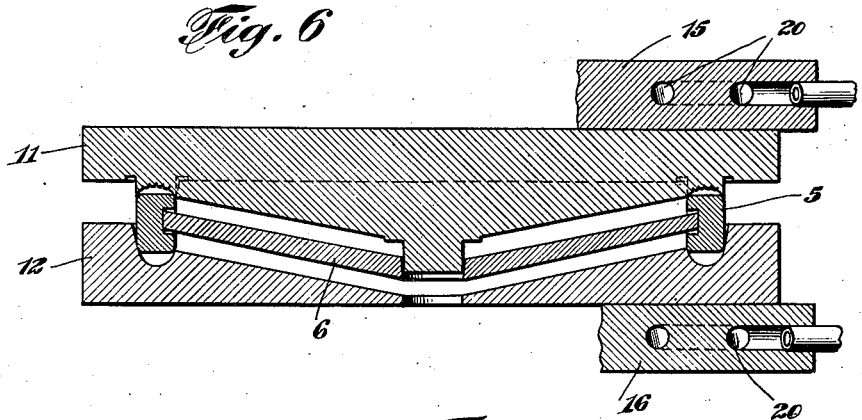
Figure 6 is a cross sectional view of the mold.
Figure 7:
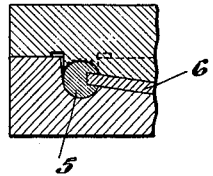
Figure 7 is a sectional view of a portion of the mold similar to Figure 6 but showing the blank in the mold after the mold has closed to form the wheel.
Figure 8:
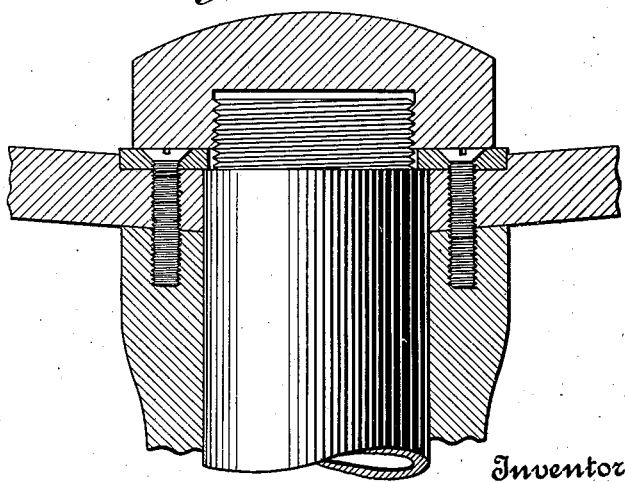
Figure 8 is an axial section through the wheel hub.

The coated and dried sections are assembled to form the complete blank as indicated in Figure 4, and the blank is compressed and molded about the spider arms and re-shaped to form the finished wheel. Preferably this pressing and molding operation is performed while the blank is maintained in heated condition and the compressed blank is cooled while held under compression. In the method selected for description the assembled blank 10 is placed in the previously heated two-part mold 11, 12, and the mold is placed in a press between heated pressure heads 15, 16. After the blank has been arranged in the mold I prefer to add additional adhesive, for example, in the form of dry powder, at the joints in order to fill all crevices and to make a stronger and better joint. The pressure heads of the press are then brought against the mold parts to press the same against the blank with a light pressure. The blank is allowed to absorb heat from the mold and the mold to absorb heat from the pressure heads for a predetermined time, for example, five minutes, until the blank becomes heated, and then the extreme pressure is applied to close the mold and compress the rim blank to form the finished rim 5 as shown in Figure 7. When the mold is closed and the blank fully compressed it is cooled while still maintaining the pressure or a part of the pressure. During the compressing and molding operation the wood will flow to conform to the shape of the mold, that is to say, the fibres of the wood will move relatively and adjust themselves to the configuration of the mold in which the blank is compressed.

The heat of the mold first softens and makes plastic the coating and then during the compressing operation the coating is forced into the pores of the wood along the surface thereof and simultaneously cured to form a hard, wear-resisting surface. The coating also acts as a lubricant between the mold and blank.

The pressure employed may range, for example, from 500 to 5,000 pounds per square inch of the blank to be compressed, depending upon the amount of compression desired, the material compressed, the size of the desired resultant article, and other particular features characteristic of the material, finish or mold. The temperature at which the operation is performed may vary considerably. Successful results have been obtained in compressing wood block blanks at temperatures which approach 300° F. I find it convenient to heat the pressure heads by steam under a pressure of about 85 pounds per square inch circulating in suitable passages 20 therein. The molds may be cooled when the pressing operation is finished by circulating water in these same passages. The preliminary heating of the molds prior to inserting the blank may be accomplished in any suitable way. I find it convenient to provide steam tables heated by steam at 85 pounds pressure on which the molds are laid until they become heated before the blank is inserted.

The invention provides an exceptionally strong fabricated structure by reason of the compressing and molding, which increases the density of the wood and increases the co-ordination of the fibres. By the term "fabricated structure" is implied one built of several parts connected with one another to form the complete structure. The operation of compressing the wood and combining the phenolic condensation product or other equivalent material with the surface thereof produces an article which will not appreciably warp or shrink but molds to a permanent set condition and has a low coefficient of expansion.

I claim as my invention:

1. A molded wheel formed of spoke and rim sections of wood separately coated with adhesive, assembled in interlocking relation and reshaped under pressure.

2. A molded wheel formed of spoke and rim sections of wood separately coated with a phenolic condensation product assembled in interlocking relation and reshaped under heat and pressure to form the wheel and to cure the phenolic condensation product coating.

3. A steering wheel comprising a rim and spokes of wood molded to one another.

4. A steering wheel combining rim and spider sections separately coated and molded the one into the other under heat and pressure to form the wheel and cure the coating.

5. A fabricated wheel comprising rim sections and spokes assembled with the spokes projecting between rim sections and the whole compressed under heat and pressure to mold the rim and spokes together.

6. A steering wheel having spoke and rim sections of wood coated with adhesive, the spoke and rim sections being connected by a mortise and tenon joint and the spokes being connected at their inner ends by a butt joint to form a hub, the whole being compressed under heat and pressure to mold the wheel and cause the adhesive to set.

7. The method of forming a fabricated wooden structure which comprises assembling the component wooden parts of the same with a mortise and tenon connection and molding the same under heat and pressure to form the article.

8. The method of making a steering wheel of wooden rim sections and wooden spoke sections which comprises covering the several sections with an adhesive adapted to harden, assembling the sections with the spoke sections projecting into recesses in the rim sections, compressing the whole to mold the rim and spoke sections together, and hardening the adhesive.

9. The method of making an all wood steering wheel which comprises covering a set of rim and spider sections with synthetic resin, assembling the sections to form a wheel, reshaping the sections under pressure to harden the synthetic resin and form the rim and spider, and securing the arms of the spider to the rim during the reshaping.

10. The method of making a steering wheel having a wooden spider and a wooden rim which comprises applying synthetic resin to a plurality of rim and spider sections, assembling the sections with the spider arms fitting into the rim, molding the assembled sections with heat and under pressure, the synthetic resin on adjoining faces of the sections uniting the same to each other, and the synthetic resin on the outer faces of the sections forming a hard weather-proof surface for the wheel.

11. The method of making a steering wheel which comprises coating complementary wooden sections with an adhesive, assembling the sections to form a rim and spider in a mold with the spider arms extending into recesses in the rim, and closing the mold to condense the sections and shape the same to form the wheel, the sections of the rim and of the spider being compressed to about one-half their original volume, and being molded together in interlocked relation.

12. The method of making a steering wheel which comprises assembling wooden spider sections and wooden rim sections to form a wheel blank, heating the blank to a temperature at which the wood becomes moldable, compressing the blank to about one-half its original volume to mold the same to form the wheel, and cooling the molded wheel while under pressure.

13. The method of forming a wheel which comprises applying to spider and rim blank sections a thin plastic coating adapted to solidify, assembling the sections to form a wheel blank, compressing the blank to substantially reduce the size thereof while the coating is in a plastic condition and thereafter allowing the coating to harden.

14. The method of forming a wheel which comprises applying to wood block sections a coating normally plastic at high temperatures, and adapted to solidify on cooling, assembling the same to form a wheel with wooden spider sections engaging into the wooden rim, heating the assembled structure, compressing the same to substantially reduce the size thereof and to cause flowing of the wood while maintaining the structure at a high temperature and thereafter allowing the blank and coating to cool under pressure.

15. The method of making a molded wooden article which comprises applying to complementary wooden rim and spider sections a coating adapted to harden, placing the coated sections in juxtaposition with the spider sections projecting between the rim sections, and compressing the assembled structure while the coating is in a plastic condition to cause the combined sections to assume the desired shape and subsequently allowing the coating to harden to secure together the sections.

16. The method of making a molded wooden wheel which comprises completely coating complementary wooden rim and spider sections, assembling the sections in a heated mold to form a wheel, and closing the mold to compress the heated sections and to cause the same to flow to conform to the mold.

17. The method of making a steering wheel which comprises assembling complementary wooden rim and spider sections in a mold with the spider arms extending into recesses in the assembled rim sections, and closing the mold under pressure to condense the wood and to cause the same to flow to conform to the shape of the mold substantially as described.

18. The method of making a steering wheel which comprises assembling wood spoke blanks and a plurality of rim section blanks, coating the same with a phenolic condensation product and molding the whole under pressure to harden the phenolic condensation product and to cause it to impregnate the sections and to cause reshaping and molding of the assembled structure to form a wheel.

19. The method of making a molded wooden wheel which comprises coating complementary rim and spider sections with liquid adhesive, assembling the sections in a heated mold to form a wheel, adding dry adhesive, and closing the mold to compress the heated sections and to cause the same to flow to conform to the mold.

20. A steering wheel having a spider formed of sections of fibrous material assembled and compressed.

21. A spider for wheels formed of sections of fibrous material coated with adhesive, compressed and molded under pressure to form a unitary spider.

22. A steering wheel comprising a rim and spokes of fibrous material, the spokes abutting on radial planes the whole being molded together to form the wheel.

23. A steering wheel comprising a rim and spokes of fibrous material secured together by molding with adhesive to form the wheel.

24. A steering wheel having a spider comprising spokes of fibrous material abutting on radial planes and molded to form a hub.

25. A steering wheel having a spider comprising spokes molded together.

26. A blank for a steering wheel comprising a rim of substantially larger cross-section than in the finished wheel and spokes of substantially larger cross-section than in the finished wheel, said rim and spokes being fitted together roughly.

27. A steering wheel comprising a rim and four spokes of fibrous material, said spokes meeting to form a hub, and the whole being compressed sufficiently to cause the material of the several parts to flow together and take a permanent set.

28. A steering wheel comprising a rim and spokes compressed sufficiently to permanently reduce their size, said spokes meeting and secured together to form a rigid hub.

29. A steering wheel having a spider comprising four spokes meeting on their radial planes and molded together with adhesive to form a rigid hub.

30. A steering wheel comprising a two-part rim the parts of which are interlocked and secured together by adhesive together with four spokes interlocked with and secured to said rim by adhesive and meeting on planes and secured together by adhesive to form a rigid hub, the whole being molded into an integral unit.

31. A steering wheel comprising a rim and spokes of fibrous material molded to one another.

32. The method of making a steering wheel which comprises molding rim and spoke blanks of fibrous material to one another.

33. The method of making a steering wheel which comprises molding rim and spoke blanks of light permeable material to one another.

34. The method of making a steering wheel which comprises assembling rim and spoke blanks including fibrous material and a curing compound, and molding them to one another.

In testimony whereof, I have signed my name to this specification this 13th day of September, 1922.

GRANT E. SMITH.